(12) United States Patent
Delahaye

(10) Patent No.: US 10,773,983 B2
(45) Date of Patent: Sep. 15, 2020

(54) PROCESS AND FACILITY FOR RECOVERING PHOSPHORUS AT A WASTEWATER TREATMENT PLANT WITH ADVANCED SLUDGE TREATMENT

(71) Applicant: SUEZ INTERNATIONAL, Paris la Defense (FR)

(72) Inventor: Mathieu Delahaye, Jouy en Josas (FR)

(73) Assignee: SUEZ INTERNATIONAL, la Defense (FR)

( * ) Notice: Subject to any disclaimer, the term of this patent is extended or adjusted under 35 U.S.C. 154(b) by 0 days.

(21) Appl. No.: 16/327,190

(22) PCT Filed: Aug. 22, 2017

(86) PCT No.: PCT/EP2017/071076
§ 371 (c)(1),
(2) Date: Feb. 21, 2019

(87) PCT Pub. No.: WO2018/036987
PCT Pub. Date: Mar. 1, 2018

(65) Prior Publication Data
US 2019/0185357 A1    Jun. 20, 2019

(30) Foreign Application Priority Data

Aug. 22, 2016   (FR) .................................. 16 57847

(51) Int. Cl.
*C02F 3/30*   (2006.01)
*C02F 11/04*   (2006.01)
*C02F 101/10*   (2006.01)

(52) U.S. Cl.
CPC .............. *C02F 3/308* (2013.01); *C02F 11/04* (2013.01); *C02F 2101/105* (2013.01); *C02F 2303/06* (2013.01); *Y02E 50/343* (2013.01)

(58) Field of Classification Search
CPC .... C02F 3/308; C02F 11/04; C02F 2101/105; C02F 2303/06; Y02E 50/343
(Continued)

(56) References Cited

U.S. PATENT DOCUMENTS

2011/0281255 A1* 11/2011 Rozich ................... C02F 11/02
435/3
2012/0094363 A1   4/2012 Nawawi-Lansade et al.
(Continued)

FOREIGN PATENT DOCUMENTS

| EP | 3 018 105 A1 | 5/2016 |
|---|---|---|
| FR | 2 942 792 A1 | 9/2010 |
| WO | 2013/110776 A1 | 8/2013 |

OTHER PUBLICATIONS

International Search Report, dated Sep. 18, 2017, from corresponding PCT/EP2017/071076 application.

*Primary Examiner* — Fred Prince
(74) *Attorney, Agent, or Firm* — Nixon & Vanderhye

(57) ABSTRACT

Disclosed is a process and a facility for recovering phosphorus present in an effluent to be treated, including the following steps: a step of biological removal of phosphorus from the effluent to be treated, a step of separating the treated water from step i and the sludge, a step of anaerobic hydrolysis of at least one portion of the sludge from step ii, a step of liquid/solid separation of the effluents from step iii, a step of advanced treatment of at least one portion of the sludge from step iv, a step of recirculation to step iii of at least one portion of the effluent from step v, and a step of recovering the phosphorus present in the effluent from step iv.

20 Claims, 7 Drawing Sheets

(58) Field of Classification Search
USPC ........ 210/603, 605, 622, 630, 259, 906, 907
See application file for complete search history.

(56) References Cited

U.S. PATENT DOCUMENTS

| | | |
|---|---|---|
| 2012/0152812 A1 | 6/2012 | Park et al. |
| 2013/0134089 A1 | 5/2013 | Cote |
| 2014/0374348 A1 | 12/2014 | Ewert et al. |
| 2015/0068976 A1 | 3/2015 | Lemaire et al. |
| 2015/0275234 A1* | 10/2015 | Ketola ............... C12P 5/023 435/167 |
| 2015/0298992 A1* | 10/2015 | Monzyk ............... C02F 1/26 210/634 |
| 2016/0023935 A1 | 1/2016 | Josse et al. |

* cited by examiner

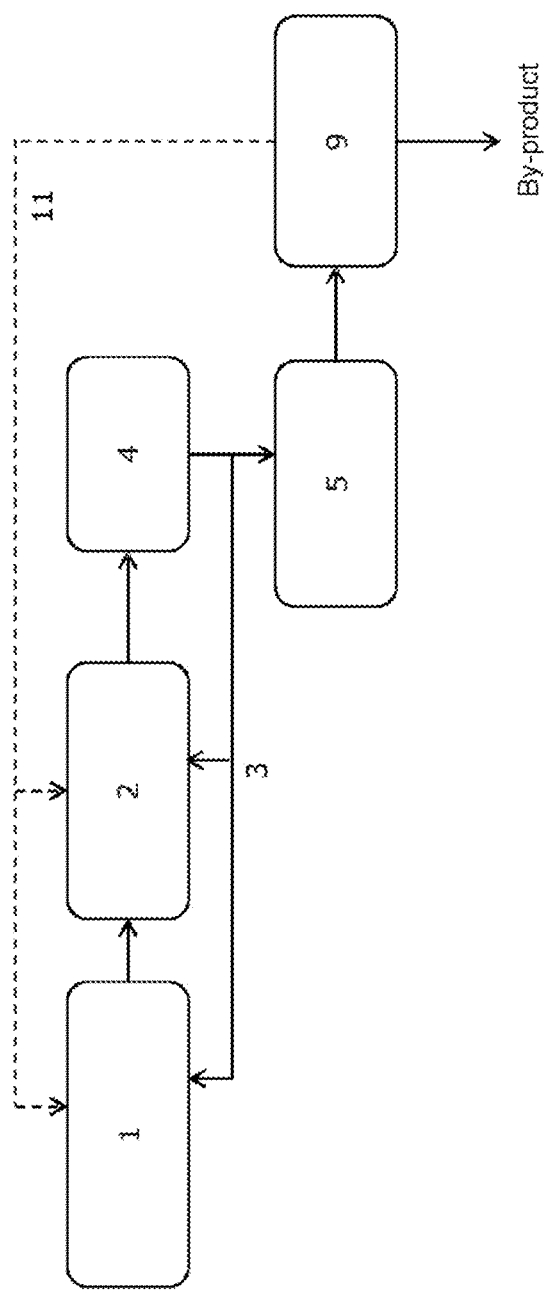

PROCESS AND FACILITY FOR RECOVERING PHOSPHORUS AT A WASTEWATER TREATMENT PLANT WITH ADVANCED SLUDGE TREATMENT

The present invention relates to a process for recovering phosphorus present in an effluent to be treated and also to a facility capable of implementing said process.

At the current time when it is being sought to preserve by any means the mineral resources, the courses of which are increasing greatly, and when the population is sensitized by the quality of its environment, the recovery of phosphorus during the treatment of wastewater at a purification plant is particularly important.

Phosphorus is an exhaustible resource for which, at the current time, there is no solution for a replacement. It is essential to human life, our body contains approximately 800 grams thereof, and it is the second most abundant mineral present in the body after calcium. Phosphorus is found in each cell, and it plays a central role in human metabolism, in our nervous system and in the good health of the skeleton. It is also vital for plants since it helps them to convert nutrients into growth elements.

Approximately 90% of the ore extracted from the ground is used as an indispensable ingredient in fertilizers. With the world population expected to reach 9 billion individuals in 2050, a sufficient supply of phosphorus-containing fertilizer for food crops must be ensured.

In point of fact, although agriculture needs phosphorus, purification plant operators must remove it in order to avoid eutrophication of fresh water systems. In addition, the presence of an excess of nutrients in a water course leads to an excessively abundant plant growth, in particular in terms of algae. As a result, the bacteria consume virtually all the oxygen present in the water, thus suffocating the fish and the aquatic fauna.

The removal process comprises its share of problems: the phosphates, which are the salts containing phosphorus, combine with magnesium and aqueous ammonia to form struvites. A struvite is a substance which blocks pipes, pumps and other equipment, thus disrupting production and causing considerable maintenance costs.

For many years, wastewater treatment techniques have been developed and implemented with the aim of discharging into the natural environment wastewater that has been purified, that is to say for which the pollution, in particular particulate, carbon-based, nitrogenous and phosphorus-bearing pollution, is reduced.

Currently, the treatment of phosphorus at a purification plant is carried out in two ways which can be complementary:
  physicochemically by the addition of a metal salt, for instance ferric chloride; this brings about the precipitation of the phosphorus which is then extracted from the water treatment system by a separator, the phosphorus being retained in the sludge resulting from the separation; the phosphorus can be recovered in various ways, but the most widespread way is the method of precipitation/crystallization in the mineral form of phosporus, such as struvite or apatite;
  biologically by the overaccumulation of the phosphorus in the sludge through the setting up of a biological dephosphatation, the principle of which consists in incorporating the phosphorus initially present in the crude water into the cellular biomass and then in discharging it with the excess sludge.

The biological dephosphatation is carried out by means of the succession of an anaerobic treatment step and an aerobic treatment step with recirculation of the sludge between these two steps.

Indeed, some bacteria (Polyphosphate-Accumulating Organisms or PAOs) have the advantageous characteristic of concentrating phosphorus in the form of polyphosphate granules when they are subjected to alternating anaerobic and aerobic conditions. The PAOs release phosphates during the period they are under anaerobic conditions and, when they then move into aerobic conditions, they accumulate an amount of phosphates greater than that released under anaerobic conditions.

Consequently, by extracting these bacteria in the form of effluent sludge, the phosphate concentration in the effluent is decreased.

When it is desired to recover the phosphorus in the sludge from wastewater, it is necessary to have an effluent with a sufficiently high phosphorus concentration, which is the case in particular when PAO bacteria are under anaerobic conditions (for example during sludge treatment by anaerobic digestion) and when they release the phosphorus previously overaccumulated.

Thus, when the excess sludge obtained after biological dephosphatation is under anaerobic conditions, the effluent resulting therefrom becomes loaded with soluble phosphorus and the recovery can then be carried out via precipitation of the phosphorus in mineral form by adding ions such as magnesium, potassium or calcium, depending on the desired mineral form.

A conventional system which makes it possible to recover phosphorus such as that which is illustrated in FIG. 2 enables the recovery of the phosphorus by virtue of the presence of a succession of anaerobic and aerobic zones (with sludge recirculation) enabling the overaccumulation of phosphorus by the PAOs and, by virtue of the anaerobic digestion, release of the phosphorus which emerges at a high concentration from the anaerobic digestion. Although this treatment system makes it possible to recover approximately 90% of the phosphorus contained in the centrates, this represents only 10% to 15% of the total phosphorus entering the purification plant. This is because a large part of the phosphorus remains trapped in the dehydrated sludge.

The conventional processes for recovering phosphorus are carried out by means of precipitation/crystallization on the purification plant centrates or digestates and have the following drawbacks:
  the average degree of phosphorus recovery is relatively low compared with the amount entering the purification plant: the average degree of phosphorus recovery is about from 10% to 15%;
  the maintenance operations are frequent and expensive since the phosphorus recovery generally takes place after the digestion of the sludge, which does not prevent precipitation of the phosphorus in the digesters, a cause of "furring up" of the digester and therefore of reduction of its working volume and of that of the pipes;
  the need for anaerobic digestion of the sludge, thereby limiting the application capacity of said sludge; and
  there is a lengthy return on investment because of the relatively low phosphorus concentrations recovered in the effluents treated and that can be exploited as fertilizer or chemical products via the production of phosphorus in mineral form.

In other words, the recovery of phosphorus is currently limited by: a low overall recovery yield at a purification plant, of about 10% to 15% of the amount of phosphorus entering, and the need to have an anaerobic digestion and also a biological dephosphatation for purification plants.

Some purification plants are equipped with advanced sludge treatment in order to reduce the volume thereof or to produce exploitable by-products, such as biochar or charcoal for agricultural use, biogas, etc. These advanced sludge treatments are often of thermal type (thermal hydrolysis, hydrothermal carbonization, wet oxidation), but may also be of chemical, biological or enzymatic type or the combination of these various types of technology. They produce very concentrated liquid effluents which are sent to the head of the plant—preferentially in the anaerobic reactor in order to provide volatile fatty acids (VFAs) for the biological removal of the phosphorus, or under anaerobic digestion conditions for increasing biogas production, or else under aerobic conditions for oxidizing them—thereby increasing the load to be treated at purification plants, leading to many additional costs.

The advanced treatments, in particular the heat treatments, often cause an increase in VFA production in the liquid effluent resulting from these treatments.

These effluents have a high concentration of carbon, particularly of VFAs, of nitrogen, particularly in the form of aqueous ammonia, and of phosphorus.

Moreover, in order for the biological removal of phosphorus to be effective, the PAOs must first consume a large amount of VFAs in order to constitute a sufficient stock of polyhydroxyalkanoates (PHAs) and to release the phosphates during their time spent under anaerobic conditions.

However, the amount of VFA available in wastewater is not generally sufficient to ensure optimal removal of the phosphorus and, for this reason, biological dephosphatation is generally coupled to physicochemical dephosphatation. However, these techniques involve a high cost, increase the amount of sludge formed during the water treatment and have a negative environmental impact in terms of carbon footprint.

New methods have been described for increasing VFA concentrations in order to improve the reduction of the phosphates via the biological route. For example, in international application WO 2013/110776, a method is described which comprises a step of producing VFAs by means of a wet treatment of an effluent having previously undergone a biological treatment under anoxia, followed by a treatment under anaerobic conditions; a portion of these VFAs is subjected to a biological treatment under anaerobic conditions before being sent back to the head of biological treatment under anoxia. In one particular embodiment of the process, the wet treatment step is preceded by an anaerobic digestion step, optionally followed by a liquid/solid separation step and by a step of ammoniacal reduction, itself preceded by a step of precipitation of the phosphates which are physicochemically treated.

However, this method, in which the recirculation is carried out at the head of the circuit, does not make it possible to obtain high degrees of phosphorus recovery. Moreover, it still combines a biological treatment and a chemical treatment, which makes it expensive and difficult to exploit industrially.

In application US 2012/0152812, the method described comprises the use of an anaerobic reactor placed on the recirculation of the sludge from the secondary clarifier (decanter) to the biological treatment. The effect of this is to reduce the sludge production and to form VFAs for the biological dephosphatation or the denitrification which normally requires external provisions of carbon. The improvement in the removal of phosphorus by assimilation thereof by PAO organisms in the presence of VFAs is only a side effect of this method and the release of the phosphorus takes place in the anaerobic tank in the water line.

Application US 2014/0374348 describes a method for recovering phosphorus from sludge, carried out between a step of thermal and chemical hydrolysis of the sludge and a digestion step.

This thermal and chemical hydrolysis of the sludge has the objective not only of making the sludge more digestible, but also of solubilizing the phosphorus, thereby reducing the risk of precipitation of phosphorus in the anaerobic digester. The phosphorus is recovered in the form of metal salts, in particular in the form of ammonium/magnesium salts, the ammonium possibly being provided by recirculation of the matter originating from the anaerobic digestion.

Insofar as the recovery of the phosphorus is carried out on a sludge matrix, this method is not very effective in terms of yields and quality of the struvite produced, which contains 20% to 30% of organic matter compared with less than 2% for the struvites produced on liquid matrices.

Consequently, there is still a need to have available a method making it possible to recover phosphorus from wastewater, which is simple to carry out and which allows good overall recovery of the phosphorus.

The aim of the present invention is thus to bring about optimal release of phosphorus on the sludge extracted in the sludge treatment line.

The process for recovering the phosphorus present in an effluent to be treated according to the invention comprises the following steps:
 i. a step of biological dephosphatation of the effluent to be treated, said step comprising:
    i.1. at least one step of treatment under anaerobic conditions, and
    i.2. at least one step of treatment under aerobic conditions;
 ii. a step of separating said treated effluent from step i, in particular the treated water from step i and the sludge;
 iii. a step of anaerobic hydrolysis of at least one portion of the sludge from step ii;
 iv. a step of liquid/solid separation of the sludge from step iii;
 v. a step of advanced treatment of at least one portion of the sludge from step iv;
 vi. a step of recirculating, to step iii, at least one portion of the liquid effluent from step v; and
 vii. a step of recovering the phosphorus present in the liquid effluent from step iv.

In accordance with the present invention, the step of biological dephosphatation of the effluent i consists of the removal of the phosphorus from said effluent by means of microorganisms, and particularly those which accumulate phosphate (PAOs). This step can be carried out in a single or in two reactor(s) according to techniques well known to those skilled in the art.

In addition, the clarification or filtration step ii can be carried out concomitantly with or subsequent to the actual biological dephosphatation step i in order to separate the treated water and the sludge.

The anaerobic hydrolysis step iii is a step during which activated biological sludge extracted from the main water treatment line comprising PAOs will use the high concentrations of VFAs present in the advanced treatment returns to produce PHAs for releasing the phosphorus that said PAOs had accumulated or overaccumulated under aerobic conditions. In particular, the PAOs may originate from the aerobic reactor and are thus loaded with phosphates.

In other words, the VFAs are converted into PHAs in the hydrolysis reactor, which allows release of the phosphorus, said PHAs possibly being subsequently broken down in an optional anaerobic digestion.

The higher the VFA concentration, the faster the phosphorus release reaction will be.

In accordance with the present invention, the liquid/solid separation step iv is a step during which the mixture from step iii is separated into two streams: a liquid effluent, and a sludge-type effluent; the liquid effluent is loaded with phosphorus and nitrogen, while the sludge-type effluent has a very low load of these two elements. It can be carried out according to any suitable technique known to those skilled in the art, and in particular this liquid/solid separation step may be mechanical dehydration, decanting, clarification, filtration, etc.

In the context of the present invention, the terms "liquid effluents" and "centrates" are considered to be synonymous.

According to the present invention, the term "advanced treatment" is intended to mean any step which makes it possible to obtain loaded effluents, for instance heat, mechanical, chemical or enzymatic treatments or a combination thereof.

When a heat treatment step is used, the latter can be carried out by any suitable technique known to those skilled in the art and which allows the production of VFAs; it may in particular involve:

heat conditioning processes such as: heat conditioning, anaerobic digestion, or a combination of these processes;

organic matter oxidation processes such as: wet oxidation under $O_2$ and under pressure, dedicated incineration with or without predrying, pyrolysis, thermolysis, gasification, ozonation or the addition of a powerful oxidizing agent such as hydrogen peroxide, or a combination of these processes;

mineral matter vitrification processes such as: post-treatment of ash by melting, gasification with integrated vitrification, or a combination of these processes; or a combination of these various types of processes.

In accordance with the present invention, the step of recirculating at least one portion of the effluent vi corresponds to the returning of the liquid effluent from step v to step iii, while the solid effluent remains in the advanced treatment, the latter allowing high concentrations of nitrogen, phosphorus and VFAs to pass into the liquid phase. Thus, the yield and the rate of recovery of phosphorus and ammonium are improved by this step owing to the maximizing of the phosphorus release.

Preferably, the term "at least one portion" is intended to mean between 90% and 99% by volume recirculation of the effluent entering the advanced treatment, and even more preferably between 93% and 96% by volume of the effluent entering the advanced treatment.

According to the present invention, the step vii of recovering the phosphorus can be carried out by any physicochemical treatment well known to those skilled in the art which enables the precipitation of the phosphorus in such a way that the phosphorus thus precipitated is extracted from the water treatment system by a separator.

Preferably, the phosphorus precipitation is carried out by adding magnesium so as to obtain struvite. However, those skilled in the art would know how to add other ions, such as calcium, to precipitate the phosphorus as another desired phosphorus-bearing ore.

Increasing the phosphorus recovery at the purification plant makes it possible to reduce the amounts of metal salts used for the physicochemical precipitation of phosphorus, thus creating operating savings and a better environmental balance.

This also makes it possible to reduce the air consumption required for the treatment of the nitrogen contained in the advanced treatment returns.

Those skilled in the art will know how to generate other advantages, such as increasing the dryness of the dehydrated sludge or reducing the amounts of polymers used for the sludge dehydration.

The main advantages of the invention are: increasing the degrees of phosphorus recovery at purification plants, and further reducing the operating problems at purification plants associated with the precipitation of phosphorus in the mineral form, for example in the form of struvite.

This innovative positioning makes it possible to:

dispense with the anaerobic digestion for recovering the phosphorus, improve the yield and the rate of recovery of the phosphorus and aqueous ammonia during the liquid/solid separation step iv owing to the use of the phosphorus, nitrogen and VFAs obtained during the advanced sludge treatments, reduce the risks of precipitation as struvite in the digesters and/or the sludge treatments located downstream of the sludge hydrolysis reactor, increase the degree of phosphorus recovery at purification plants while at the same time decreasing the reagent requirements for ensuring physicochemical dephosphatation, and the air requirements for treating the nitrogen, said overall degree of phosphorus recovery over the whole of the purification plant being at least approximately 30%, preferably at least equal to 40%, preferably being between 40% and 80%, and even more preferably being between 45% and 60%.

The removal of the phosphorus before the sludge treatment also makes it possible to improve the dehydratability of the sludge.

The effluents to be treated according to the process of the invention may be any water of industrial origin, in particular industrial effluents, or of agricultural, municipal or domestic origin.

According to one particular embodiment of the invention, the step vii of recovering the phosphorus can be carried out on the same site as steps i to vi or can be carried out on a different site through transportation of the effluents from step iv.

In one advantageous embodiment of the invention, the process also comprises an anaerobic digestion step between steps iv and v.

In the context of the present invention, the terms "anaerobic digestion" and "methanization" are equivalent.

In accordance with the present invention, the anaerobic digestion step can be carried out by any treatment which makes it possible to reduce the mass of the sludge by anaerobic biological degradation, it being possible for the latter to be carried out in particular by fermentation, and it can be carried out in one or two phase(s).

When the anaerobic digestion step is carried out in two phases, it consists of rapid hydrolysis of the organic matter, then of optimization of the methane fermentation.

According to another advantageous embodiment of the process of the invention, the anaerobic digestion step may be a codigestion step, that is to say that it uses both sludge from step iv and co-substrates to maintain the supply of organic matter.

The term "co-substrate" is intended to mean any organic waste with a high methanogenic capacity, for instance unsold material from supermarkets, fermentable household garbage, fats, liquid manure, etc.

In one advantageous embodiment of the invention, the process also comprises a biogas exploitation step after said anaerobic digestion step.

In the context of the invention, the biogas exploitation step may be a heat exploitation, a cogeneration, an injection into the natural gas network, a biofuel production, or any other exploitation known to those skilled in the art.

In one advantageous embodiment of the invention, the liquid from step vii is recirculated to step i. Thus, at least one portion of the liquid from step vii is sent back to one and/or the other of the biological dephosphatation reactors.

In one advantageous embodiment of the invention, and in order to ensure optimal release of the phosphorus, the residence time, in the anaerobic hydrolysis unit, of the effluent from step ii is less than 4 h, preferably between 30 min and 4 h, even more preferably between 30 min and 2 h.

In addition, this advantageous embodiment of the invention also makes it possible to reduce the size of the reactor and, as a result, to reduce the purification plant.

In one advantageous embodiment of the invention, the overall degree of phosphorus recovery is greater than approximately 30% of the total phosphorus entering, preferably greater than approximately 40% of the total phosphorus entering, preferably is between 40% and 80%, and even more preferably is between 45% and 60%.

According to another aspect of the invention, the effluents originating from the advanced sludge treatment v may be subjected to a nitrogen recovery or removal step in order to reduce the excess nitrogen during the precipitation of the struvite and to also avoid recirculation of the nitrogen in the water treatment line, which would then require energy to be used in order to oxidize the nitrogen.

This recovery or removal step may make it possible to adjust to the best level the nitrogen/phosphorus ratio in the phosphorus release reactor in order to limit the nitrogen returns into the water system. This step may be carried out preferentially by recovery of the nitrogen or by biological removal by nitrification/denitrification, nitrate shunt, that is to say direct denitrification of the accumulated nitrites to give dinitrogen gas, or deammonification by means of bacteria of anammox type, that is to say bacteria capable of anaerobic oxidation of ammonium.

A subject of the present invention is also a facility capable of recovering the phosphorus present in an effluent to be treated, comprising at least one anaerobic reactor, at least one aerobic reactor, a separator, at least one phosphorus release reactor, at least one advanced sludge treatment unit, at least one means for communication between the at least one phosphorus release reactor and the at least one advanced sludge treatment unit, and at least one phosphorus recovery unit.

In order to optimize the phosphorus recovery, the anaerobic reactor of the invention may receive the activated sludge resulting from a primary treatment of an effluent, that is to say that the anaerobic reactor may be placed at the level of the extraction of the sludge.

According to the present invention, the term "phosphorus release reactor" is intended to mean any device in which the PAOs are under conditions for phosphorus release, in particular under anaerobic conditions, in the presence of VFAs, or in any other favorable environment known to those skilled in the art.

In the present invention, the terms "phosphorus release reactor" and "phosphorus hydrolysis reactor" are considered to be equivalent.

For the purposes of the present invention, an "advanced treatment unit" is any device capable of destroying or converting the organic matter of the purification sludge, thus making it possible to considerably reduce the amounts to be discharged. In the case where this advanced treatment is a heat treatment, such a device would for example be: a rotary furnace, a grate furnace, a stage furnace or a superposed hearth furnace, a fluidized bed furnace, a combination thereof, or any other device known to those skilled in the art and capable of implementing in particular a thermolysis, thermal hydrolysis, hydrothermal carbonization or wet oxidation process.

In accordance with the present invention, the "phosphorus recovery unit" is a device in which a physicochemical treatment well known to those skilled in the art allows precipitation of the phosphorus.

The separator is required in order to separate the treated water from the sludge produced. It may be an integral part of the at least one aerobic reactor, or even of the at least one anaerobic reactor. This is the case, in particular, with sequencing batch reactors.

In one advantageous embodiment of the invention, the facility may also comprise at least one means for communication between the at least one phosphorus recovery unit and the at least one anaerobic reactor and/or the at least one aerobic reactor.

In one advantageous embodiment of the invention, the facility may also comprise an anaerobic digester.

In accordance with the present invention, the term "anaerobic digester" is intended to mean any digester capable of breaking down the organic matter of the sludge produced in order to produce biogas, it being possible for said digester to be composed of one or two reactor(s).

In one advantageous embodiment of the invention, the facility may be coupled with a facility for biogas exploitation.

The hydrolysis of the sludge under anaerobic conditions will generate PHAs, which can be favorably converted into biogas in an anaerobic digestion reactor.

FIGS. 1 to 4 illustrate various conventional systems and FIGS. 5 and 6 and the example hereinafter illustrate the present invention without however being limited thereto.

FIG. 1 represents a conventional water treatment system without phosphorus recovery.

FIG. 2 represents a conventional water treatment system with recovery of phosphorus by precipitation/crystallization from the digested sludge dehydration centrates.

FIG. 3 represents a conventional water treatment system in which there is advanced sludge treatment without phosphorus recovery.

Figure 1:
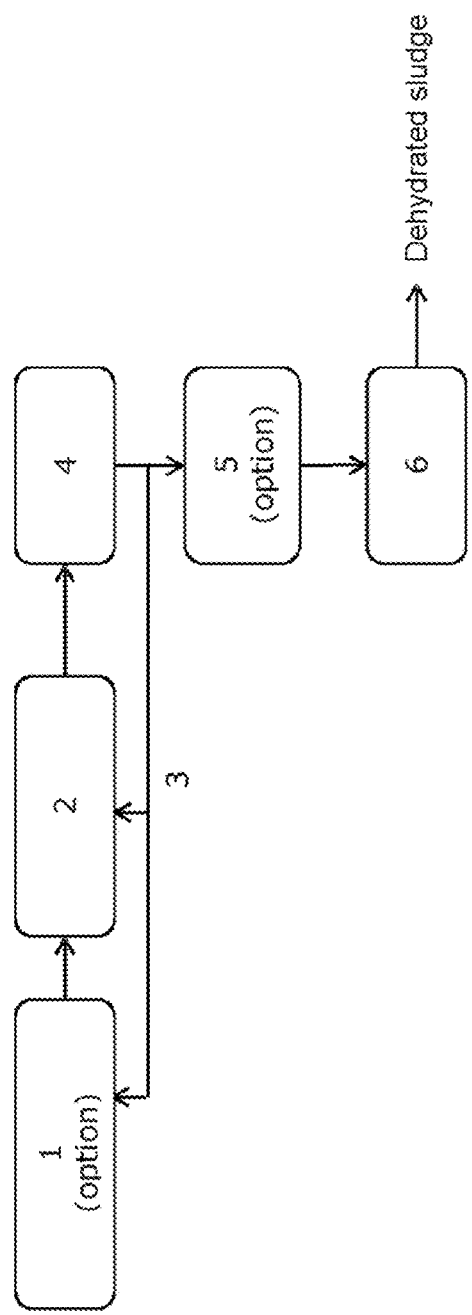
Figure 2:
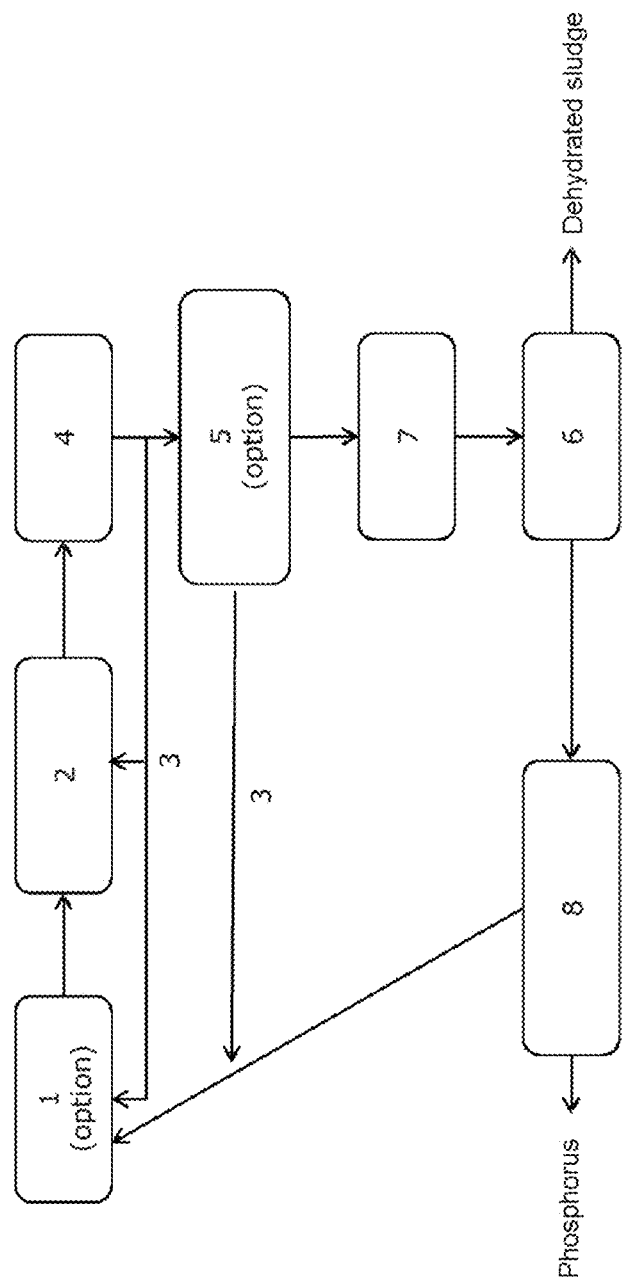

In the conventional systems, illustrated in FIGS. 1 to 4b, the water to be treated enters an aerobic/anoxic and aerobic reactor (2), it being possible for said reactor to be preceded by an anaerobic reactor (1). The effluents from (2) are then separated by a separator (4), following which at least one portion of the sludge is recirculated (3), while the other may undergo liquid/solid separation in a separator (5). Once the effluents have been separated and/or thickened, they can undergo dehydration (6) and/or anaerobic digestion (7) (FIG. 2). Some conventional systems also use a phosphorus-recovering device (8) at the end of treatment (FIG. 2).

Figure 4A:
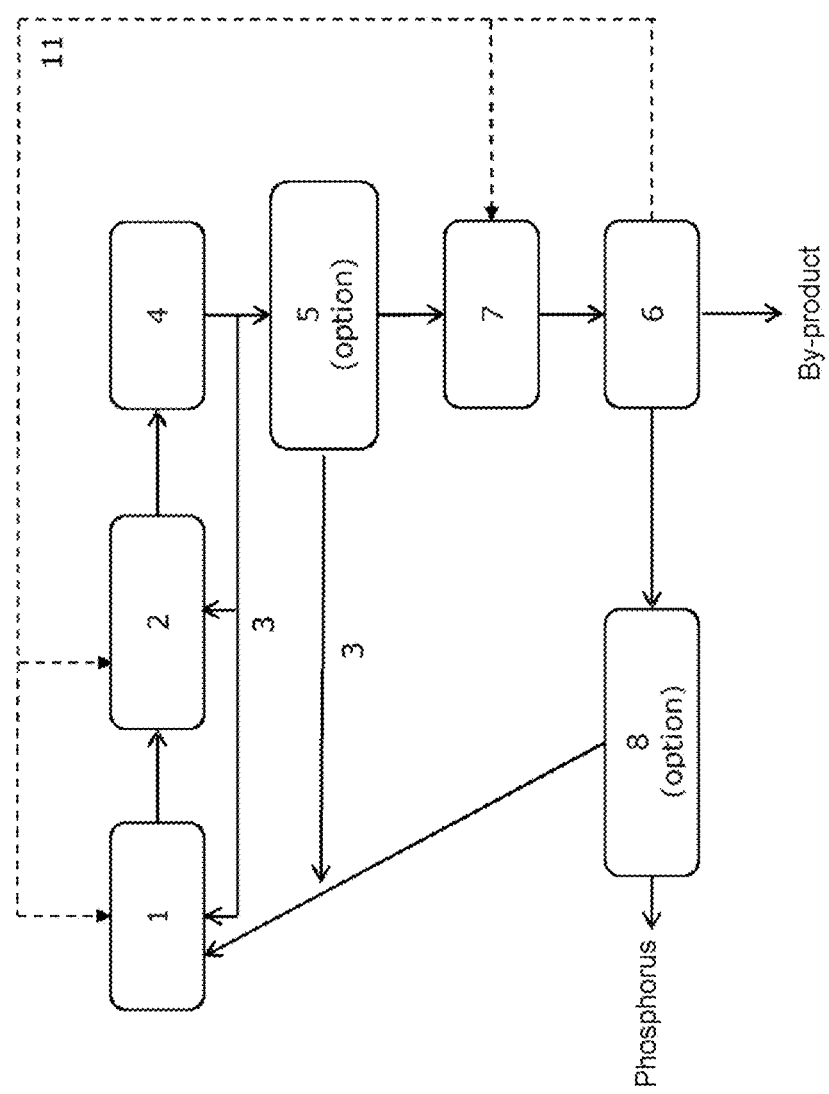
FIGS. 4a and 4b represent conventional systems with advanced sludge treatment and phosphorus recovery from the anaerobic digestion centrates (FIG. 4a) or phosphorus recovery from the advanced treatment returns (FIG. 4b).
Figure 4B:
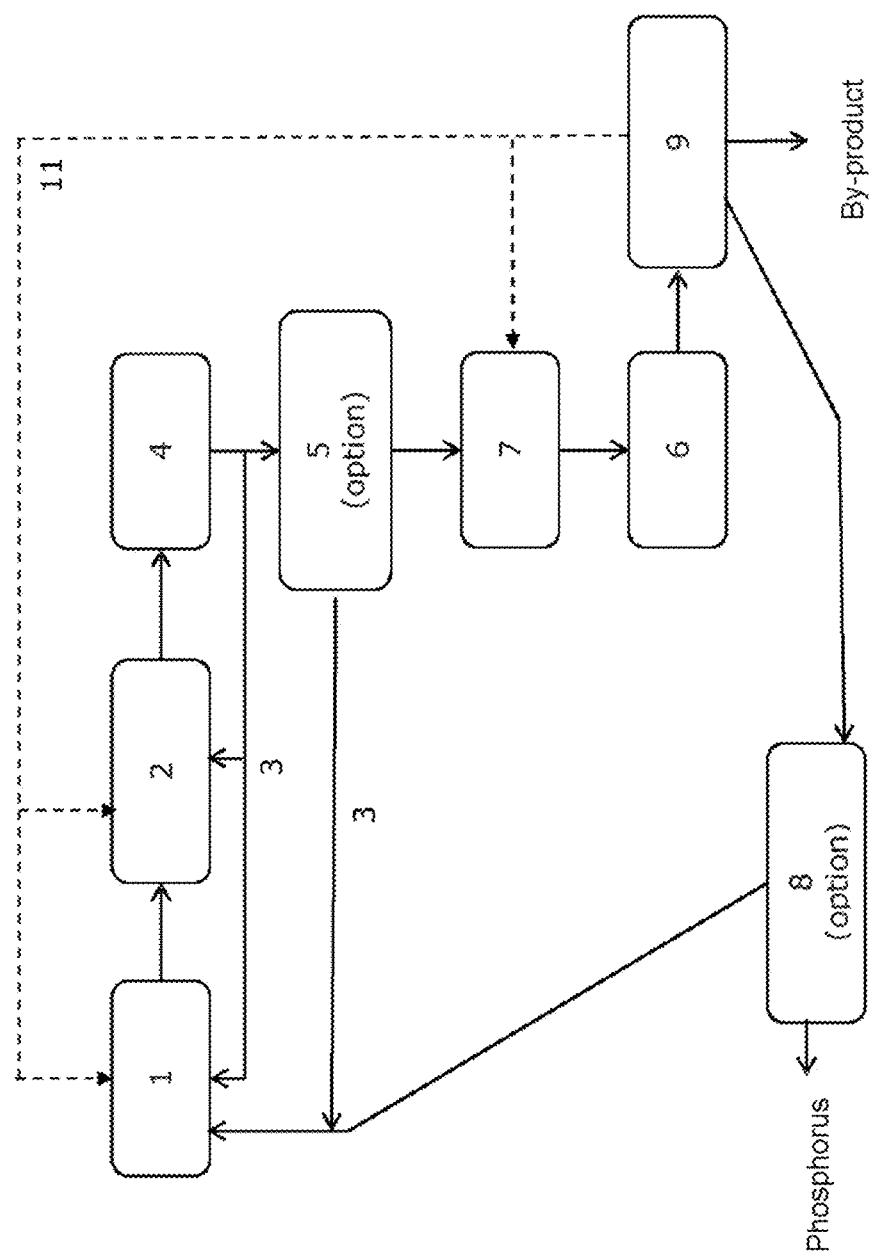

FIGS. 3, 4a and 4b represent conventional systems which also have an advanced treatment unit (9) from which the advanced treatment liquid returns, or centrates (11), are sent back to the head of the treatment, preferably:

in the anaerobic reactor (1) in order to supply VFAs for the biological removal of the phosphorus;

in the anaerobic digester (7) for increasing the biogas production; or in the aerobic reactor (2) for oxidizing the VFAs.

Figure 5:
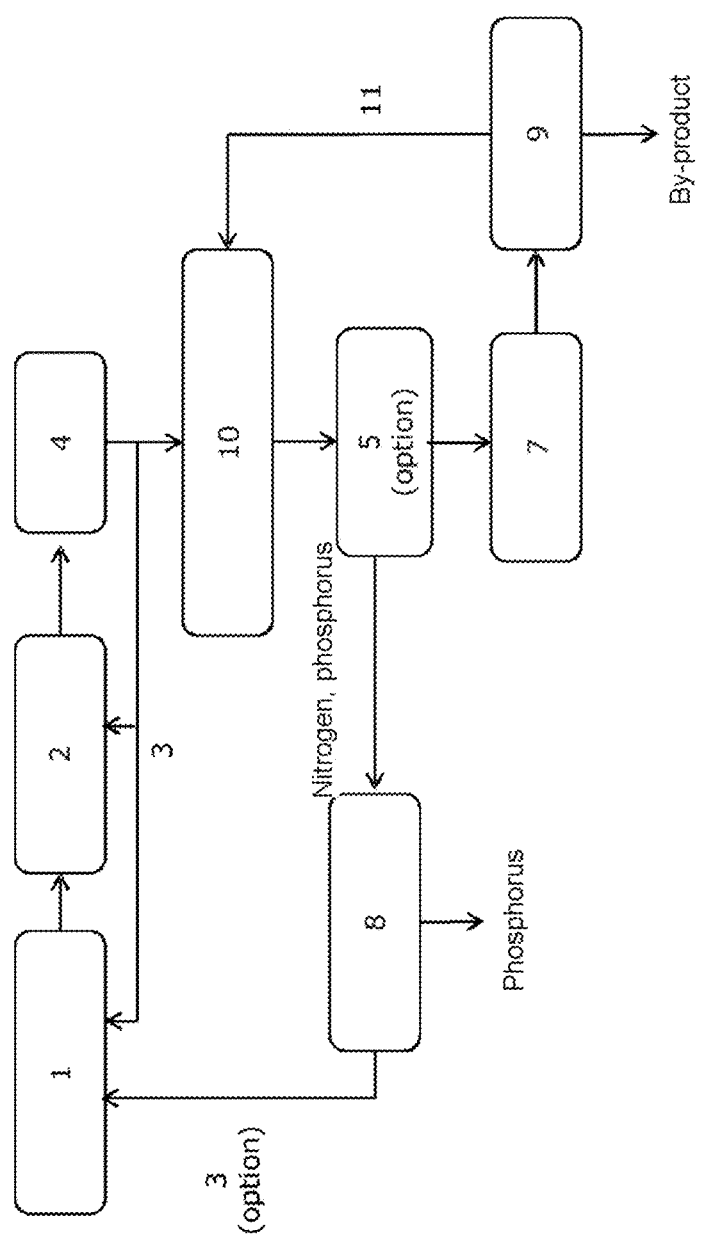
FIG. 5 represents a water treatment system for recovering phosphorus with anaerobic digestion according to one embodiment of the invention.
Figure 6:
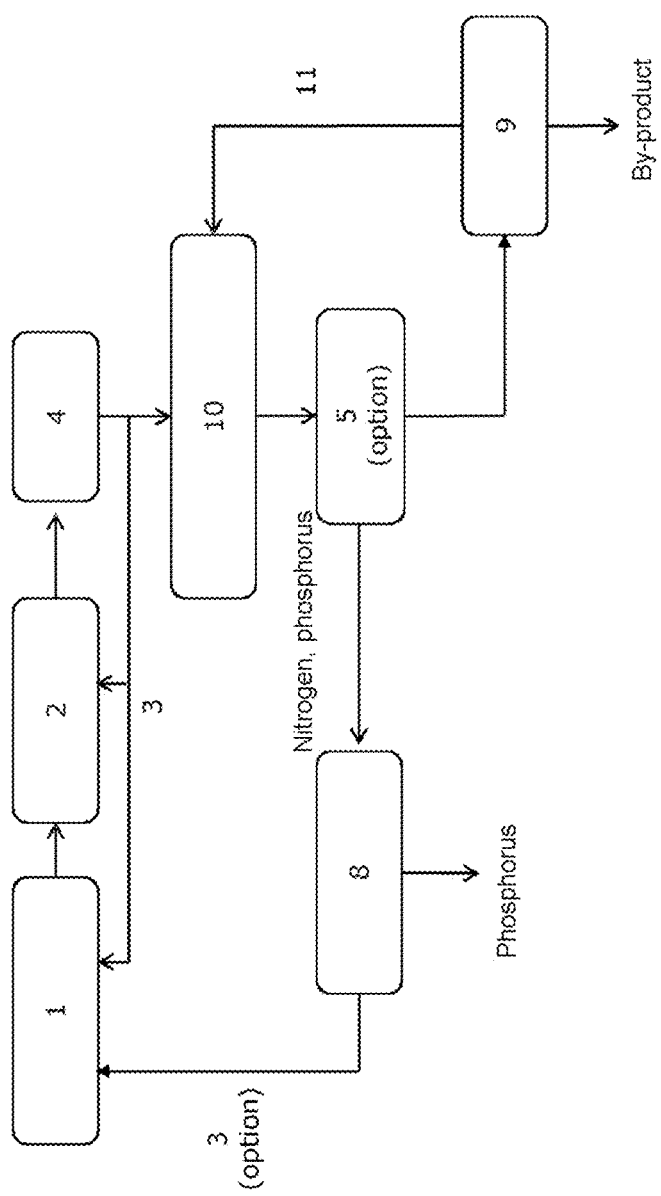
FIG. 6 represents a water treatment system for recovering phosphorus without anaerobic digestion according to another embodiment of the invention.

In one system according to the present invention, two embodiments of which are illustrated in FIGS. 5 and 6, the effluents from the separator (4) and also the effluents (11) originating from the advanced treatment unit (9) feed the phosphorus release reactor (10).

The reactor (10) receives the effluents that have previously spent time in the reactor (2), said effluents comprising PAOs which will use the high concentrations of VFAs present in the advanced treatment returns (11) to produce PHAs and to release the phosphorus.

This amount of phosphorus resulting from the release will add to the amount of phosphorus originating from the advanced treatment returns (11).

The effluent from the reactor (10) can be subjected to a liquid/solid separation (5), for example via a thickener. The liquid effluent, loaded with phosphorus, from the reactor (10) or from the separator (5) passes into a phosphorus recovery unit (8); the phosphorus recovery can be carried out for example by precipitation of struvite. The nitrogen present in the advanced treatment returns (11) also promotes this precipitation.

The major portion of the effluent from the separator (5) is then treated in at least one advanced treatment unit (9) in the presence or absence of an anaerobic digester (7).

The example below makes it possible to compare the treatment according to the invention with the conventional treatments.

EXAMPLE

Table 1 below expresses the loads received by a wastewater purification plant for an equivalent of 360 000 inhabitants.

TABLE 1

Loads received by the purification plant

| Daily flow rate | 100 000 m³/d |
|---|---|
| PUPL Entry | |
| COD | 140 g/IE |
| BOD5 | 60 g/IE |
| TKN | 14 g/IE |
| Pt | 2.5 g/IE |
| COD | 50.4 t/d |
| BOD5 | 21.6 t/d |
| TKN | 5.0 t/d |
| Pt | 0.9 t/d | g/IE: grams of pollution per inhabitant equivalent
PUPL: purification plant
COD: chemical oxygen demand, represents the carbon-based pollution TABLE 1-continued Loads received by the purification plant BOD5: biochemical oxygen demand
TKN: total Kjeldahl nitrogen, represents the nitrogenous pollution
Pt: total phosphate, represents the phosphorus-bearing pollution
t/d: tonnes/day corresponds to the multiplication of the grams of pollution per inhabitant equivalent by the m³/d.

In the case of a phosphorus recovery from the digestion centrates (FIG. 2), the amount of phosphorus in the centrates is about 0.14 t/d (the centrate flow rate is about 540 m³/d for a phosphorus concentration of 250 mg/l). The phosphorus recovery reactor enables a recovery of about 0.12 tP/d, i.e. a 90% yield. Over the whole of the purification plant, this gives a degree of phosphorus recovery of 14%.

In the case of a conventional system with heat treatment where the phosphorus recovery is carried out on the sludge heat treatment returns (FIG. 4b), the amount of phosphorus recovered is higher by virtue of the new dissolution of the phosphorus contained in the sludge during the heat treatment and the phosphorus concentration is about 0.29 t/d.

The phosphorus concentration in the heat treatment returns is about 2.6 g/l and the flow rate of said returns is about 110 m³/d. The phosphorus recovery yield over the whole of the purification plant is then 32%.

This type of system is purely theoretical because of the high concentrations of COD (in particular VFAs), of nitrogen but also of phosphorus that may in practice impair the phosphorus precipitation. In addition, a dilution would be required, which is not economically favorable.

In the case of the systems according to the invention illustrated in FIGS. 5 and 6, where the heat treatment returns supply phosphorus, VFAs and nitrogen, whilst the excess biological sludge releases the overaccumulated phosphorus in the presence of VFAs, the phosphorus concentration in the heat treatment returns is about 2.6 g/l for a flow rate of 110 m³/d. The amount of phosphorus recovered is 0.45 t/d, the phosphorus recovery yield over the whole of the purification plant is then 41%.

Thus, the process according to the invention makes it possible to achieve high phosphorus recovery yields even in the absence of anaerobic digestion.

The invention claimed is:

1. A process for recovering the phosphorus present in an effluent to be treated, comprising the following steps:
   i. a step of biological dephosphatation of the effluent to be treated, said step comprising:
      i.1. at least one step of treatment under anaerobic conditions, and
      i.2. at least one step of treatment under aerobic conditions;
   ii. a step of separating said treated effluent from step i, in particular the treated water from step i and the sludge;
   iii. a step of anaerobic hydrolysis of at least one portion of the sludge from step ii;
   iv. a step of liquid/solid separation of the effluent from step iii;
   v. a step of advanced treatment of at least one portion of the sludge from step iv;
   vi. a step of recirculating, to step iii, at least one portion of the liquid effluent from step v; and
   vii. a step of recovering the phosphorus present in the liquid effluent from step iv.

2. The process as claimed in claim 1, further comprising an anaerobic digestion step between steps iv and v.

3. The process as claimed in claim 2, further comprising a biogas exploitation step after the anaerobic digestion step.

4. The process as claimed in claim 3, wherein the liquid from step vii is recirculated to step i.

5. The process as claimed in claim 3, wherein the residence time of the effluent from step ii is less than 4 h.

6. The process as claimed in claim 2, wherein the liquid from step vii is recirculated to step i.

7. The process as claimed in claim 2, wherein the residence time of the effluent from step ii is less than 4 h.

8. The process as claimed in claim 1, wherein the liquid from step vii is recirculated to step i.

9. The process as claimed in claim 8, wherein the residence time of the effluent from step ii is less than 4 h.

10. The process as claimed in claim 1, wherein the residence time of the effluent from step ii is less than 4 h.

11. The process of claim 10, wherein the residence time of the effluent from step ii is between 30 min and 4 h.

12. The process of claim 10, wherein the residence time of the effluent from step ii is between 30 min and 2 h.

13. The process as claimed in claim 1 wherein the degree of phosphorus recovery is greater than approximately 30% of the total phosphorus entering.

14. The process of claim 13, wherein the degree of phosphorus recovery is greater than approximately 40% of the total phosphorus entering.

15. The process of claim 13, wherein the degree of phosphorus recovery is between 40% and 80% of the total phosphorus entering.

16. The process of claim 13, wherein the degree of phosphorus recovery is between 45% and 60% of the total phosphorus entering.

17. A facility for recovering the phosphorus present in an effluent to be treated, comprising at least one anaerobic reactor (1), at least one aerobic reactor (2), a separator (5), at least one phosphorus release reactor (10), at least one advanced sludge treatment unit (9), at least one means for communication between the at least one phosphorus release reactor and the at least one advanced treatment unit, and at least one phosphorus recovery unit (8).

18. The facility as claimed in claim 17, further comprising at least one means for communication between the at least one phosphorus recovery unit and the at least one anaerobic reactor and/or the at least one aerobic reactor.

19. The facility as claimed in claim 17, further comprising an anaerobic digester.

20. The facility as claimed in claim 17, wherein the facility is coupled with a facility for biogas exploitation.

* * * * *